US010344889B2

(12) United States Patent
Toffle

(10) Patent No.: US 10,344,889 B2
(45) Date of Patent: Jul. 9, 2019

(54) CONTROL VALVES WITH SAFETY GUARDS

(71) Applicant: Seagate Technology LLC, Cupertino, CA (US)

(72) Inventor: Mark A. Toffle, St. Louis Park, MN (US)

(73) Assignee: Seagate Technology LLC, Cupertino, CA (US)

( * ) Notice: Subject to any disclaimer, the term of this patent is extended or adjusted under 35 U.S.C. 154(b) by 119 days.

(21) Appl. No.: 15/718,731

(22) Filed: Sep. 28, 2017

(65) Prior Publication Data

US 2019/0093790 A1 Mar. 28, 2019

(51) Int. Cl.
*F16K 35/02* (2006.01)
*F16K 31/44* (2006.01)
*F16K 31/42* (2006.01)

(52) U.S. Cl.
CPC .......... *F16K 35/025* (2013.01); *F16K 31/426* (2013.01); *F16K 31/44* (2013.01)

(58) Field of Classification Search
CPC . F16K 31/426; F16K 35/025; Y10T 137/7069
See application file for complete search history.

(56) References Cited

U.S. PATENT DOCUMENTS 2,861,592 A * 11/1958 Collins ................. F16K 31/426
137/625.64
5,597,015 A * 1/1997 Asou ..................... F15B 13/043
137/625.64
6,952,319 B2 10/2005 Weiehelt et al.
6,959,910 B2 * 11/2005 Matsumoto ......... F16K 31/0627
251/129.03
7,316,244 B2 1/2008 Miyazoe et al.
7,328,720 B2 * 2/2008 Miyazoe ............... F16K 27/003
137/271
7,677,264 B2 * 3/2010 Miyazoe ............... F16K 31/426
137/269
9,010,375 B2 * 4/2015 Narita ................. F16K 31/0675
137/625.65

OTHER PUBLICATIONS

SMC Corporation of America. "4 Port Solenoid Valve Cassette Type Manifold". SMC Series SJ2000-3000 Product Catalogue. 110 pages. 2013.

* cited by examiner

*Primary Examiner* — Kevin F Murphy
(74) *Attorney, Agent, or Firm* — Faegre Baker Daniels LLP

(57) ABSTRACT

A directional control valve comprising: a body, an actuator configured to switch the directional control valve between two or more states, a manual activation button configured to initiate actuation of the actuator when pressed, a safety member configured to slide along a guide of the body between a first position and a second position, a coupling member configured to couple the directional control valve to other directional control valves, and a guard removably disposed between the safety member and the coupling member. The safety member prevents the manual actuation button from being actuated when it is in the first position and the manual actuation button can be manually actuated when the safety member is in the second position. In addition, the guard is configured to prevent the safety member from sliding to the second position when the guard is disposed between the safety member and the coupling member.

20 Claims, 6 Drawing Sheets

US 10,344,889 B2

CONTROL VALVES WITH SAFETY GUARDS

TECHNICAL FIELD

This application relates generally to directional control valves and, more specifically, to an apparatus configured to prevent the accidental actuation of a directional control valve.

BACKGROUND

Many companies use directional control valves in manufacturing, testing, and packaging facilities. In order to automate certain functions, directional control valves can be programmed to actuate upon one or more conditions being met. For example, in response to safety door being locked and/or a start button being pressed, a directional control valve incorporated into a servo-track writer may automatically actuate, thereby directing the servo-track writer to move a workpiece and/or component of a workpiece to a desired position. Many directional control valves can also be manually actuated via one or more manual activation mechanisms.

SUMMARY

In certain embodiments, a directional control valve comprises: a body; an actuator integrated into the body, the actuator configured to switch the directional control valve between two or more states; at least one manual activation button configured to initiate actuation of the actuator when pressed; a safety member configured to slide along a guide of the body between a first position and a second position, wherein when the safety member is in the first position the manual activation button is prevented from being actuated, and wherein when the safety member is in the second position the manual activation button can be manually actuated; a coupling member configured to couple the directional control valve to other directional control valves; and a guard removably disposed between the safety member and the coupling member, the guard configured to prevent the safety member from sliding along the guide to the second position when the guard is disposed between the safety member and the coupling member.

In certain embodiments, a directional control valve comprises: a body; an actuator integrated into the body, the actuator configured to switch the directional control valve between two or more states; a manual activation button configured to initiate actuation of the actuator when pressed; a safety member configured to slide along a guide of the body between a first position and a second position, wherein when the safety member is in the first position the manual activation button is prevented from being actuated, and wherein when the safety member is in the second position the manual actuation button can be manually actuated; and means for maintaining the safety member in the first position.

In certain embodiments, a directional control valve kit having component parts being capable of being assembled, the directional control valve kit comprises: a directional control valve including: a body, an actuator integrated into the body, the actuator configured to switch the directional control valve between two or more states, at least one manual activation button configured to initiate actuation of the actuator when pressed, a safety member configured to slide along a guide of the body between a first position and a second position, wherein when the safety member is in the first position the manual activation button is prevented from being actuated, and wherein when the safety member is in the second position the manual actuation button can be manually actuated, and a coupling member configured to couple the directional control valve to other directional control valves; and a guard configured to be removably disposed between the safety member and the coupling member to prevent the safety member from sliding along the guide to the second position.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

Figure 1:
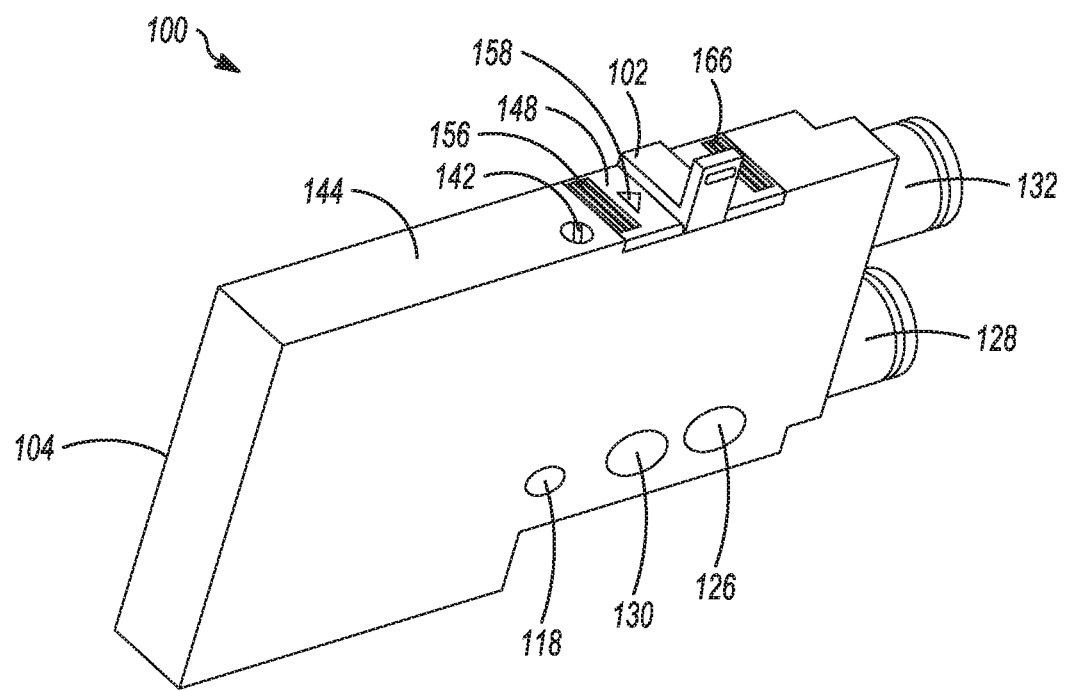
FIG. 1 is an isometric view of a directional control valve including a guard, in accordance with embodiments of the present disclosure.

While the disclosed subject matter is amenable to various modifications and alternative forms, specific embodiments have been shown by way of example in the drawings and are described in detail below. The intention, however, is not to limit the subject matter disclosed herein to the particular embodiments described. On the contrary, the disclosure is intended to cover all modifications, equivalents, and alternatives falling within the scope of the subject matter disclosed herein, and as defined by the appended claims.

The terms "up," "upper," and "upward," and variations thereof, are used throughout this disclosure for the sole purpose of clarity of description and are only intended to refer to a relative direction (i.e., a certain direction that is to be distinguished from another direction), and are not meant to be interpreted to mean an absolute direction. Similarly, the terms "down," "lower," and "downward," and variations thereof, are used throughout this disclosure for the sole purpose of clarity of description and are only intended to refer to a relative direction that is at least approximately opposite a direction referred to by one or more of the terms "up," "upper," and "upward," and variations thereof.

DETAILED DESCRIPTION

As stated above, many directional control valves can be manually actuated via one or more manual activation buttons. For example, some models of directional control valves manufactured by SMC Corporation (e.g., the SJ3260, SJ3160, and SJ31600R models) may be manually actuated by moving one or more safety members and turning or pressing a manual activation button on the directional control valve. Many of these directional control valves that include manual activation buttons, however, do not have a mechanism to prevent accidental manual activation. In the event someone does accidentally actuate a manual activation button of a directional control valve that is powered on, one or more adverse events could occur. For example, a directional control valve that is being used in servo-track writer and accidently manually actuated could result in the expulsion of a spinning hub or the explosion of a low profile cylinder or diaphragm. As such, there is a need in the art for a mechanism to prevent the accidental actuation of a manual activation button of a directional control valve. The embodiments provided herein disclose a solution to this need.

Figure 2:
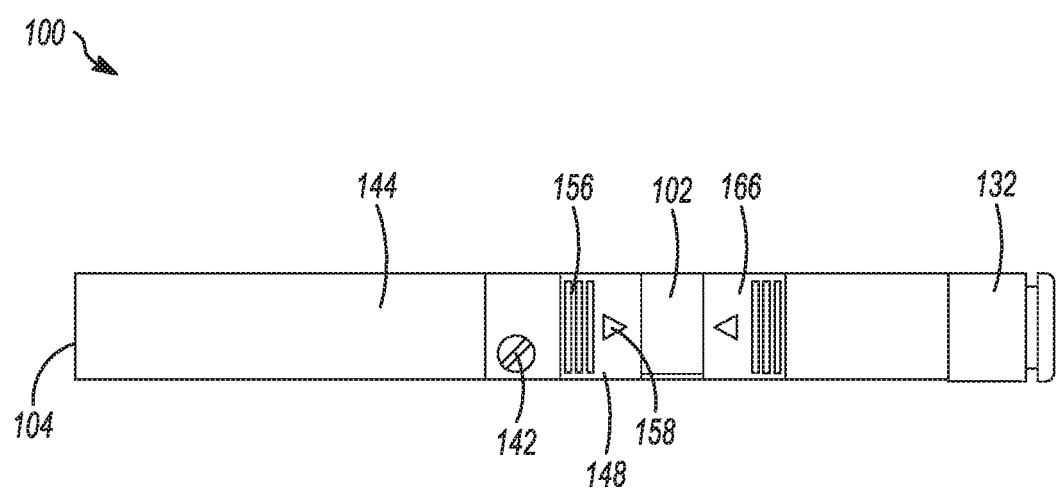
FIG. 2 is a top view of the directional control valve including a guard depicted in FIG. 1, in accordance with embodiments of the present disclosure.
Figure 3:
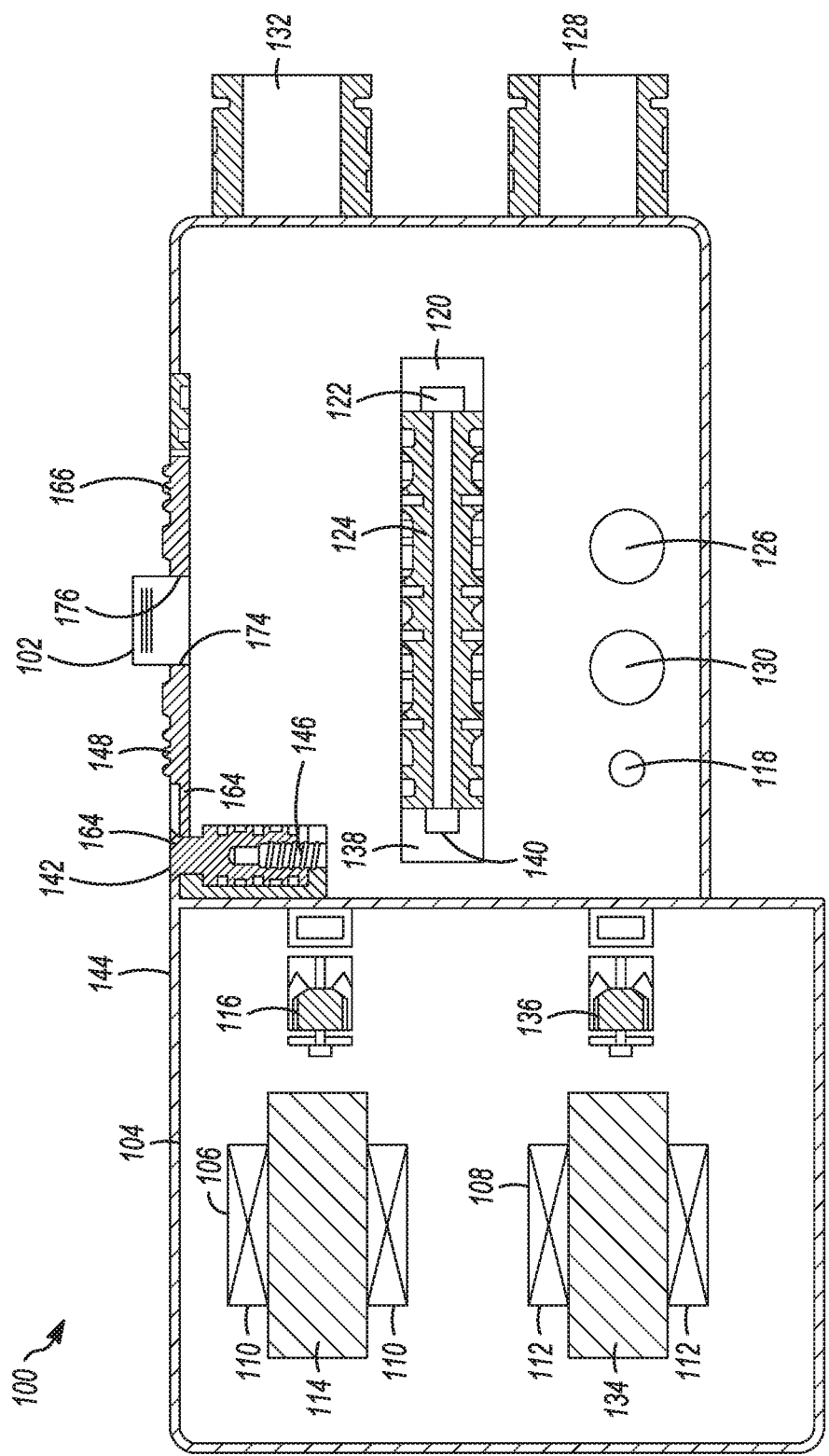
FIG. 3 is a cross-sectional view of the directional control valve including a guard depicted in FIGS. 1 and 2, in accordance with embodiments of the present disclosure.
Figure 4:
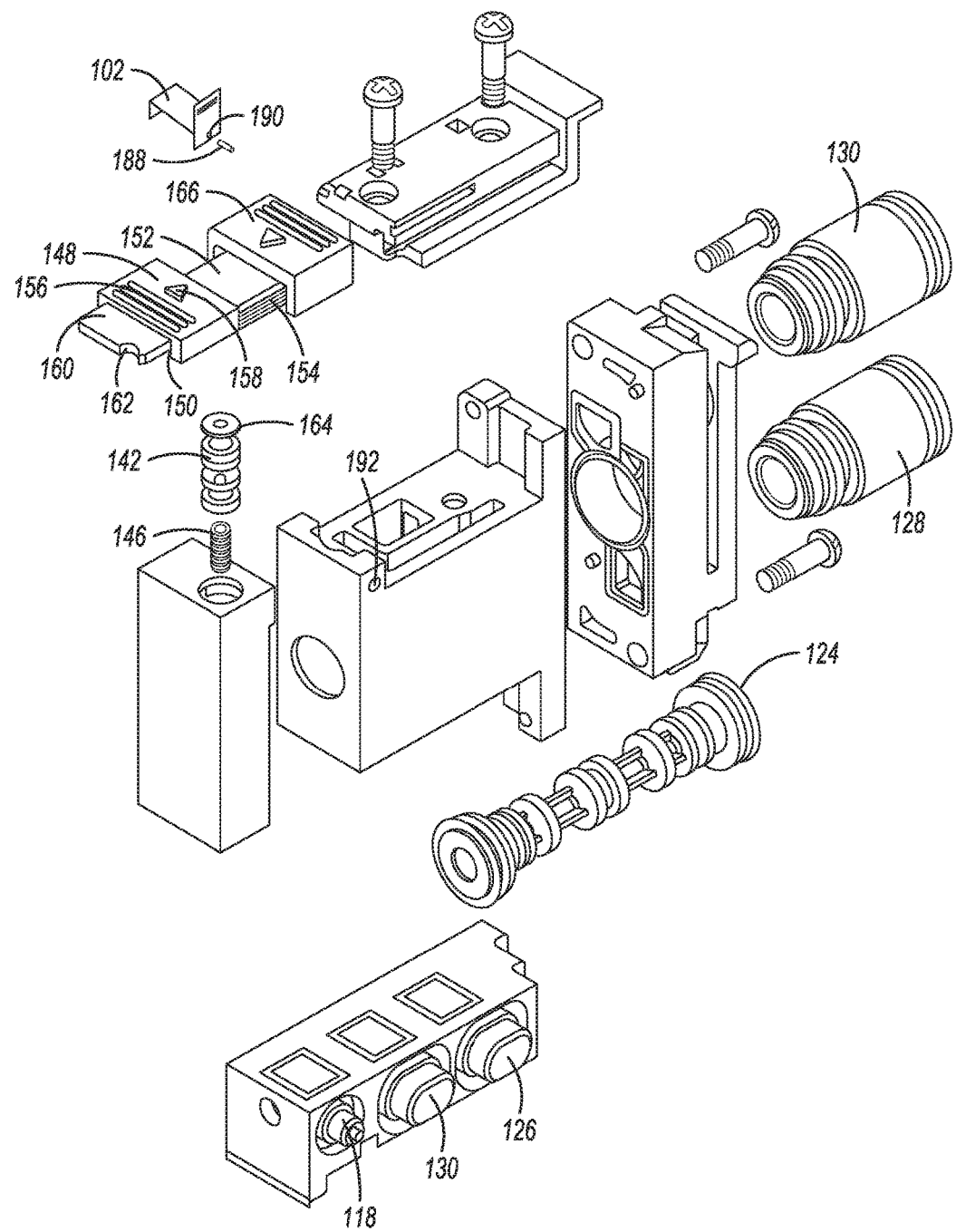
FIG. 4 is an exploded isometric view of an anterior portion of the directional control valve and guard depicted in FIGS. 1-3, in accordance with embodiments of the present disclosure.
Figure 5A:
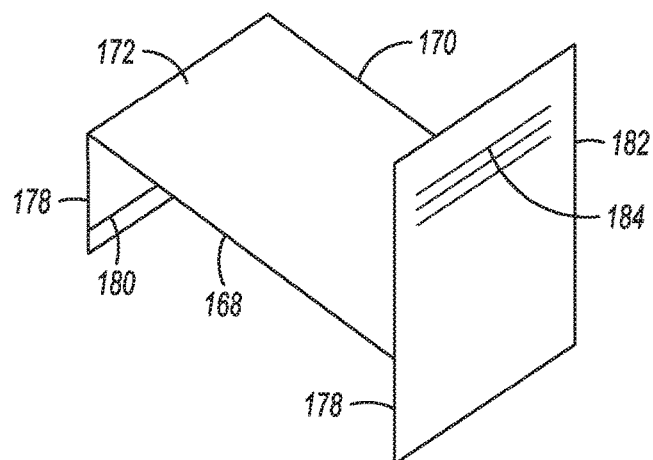
FIGS. 5A-5F are isometric views of different exemplary guards, in accordance with embodiments of the present disclosure.
Figure 5B:
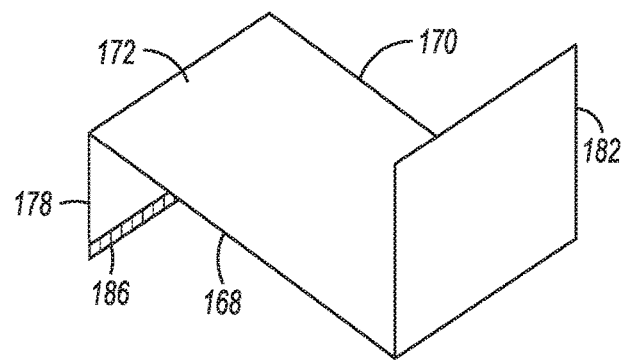
Figure 5C:
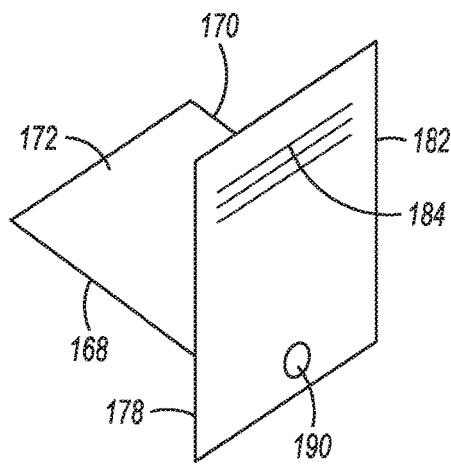
Figure 5D:
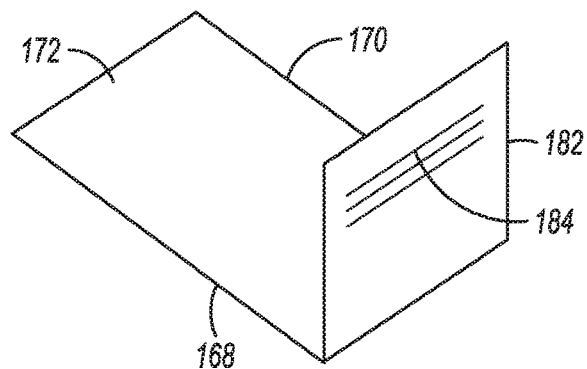
Figure 5E:
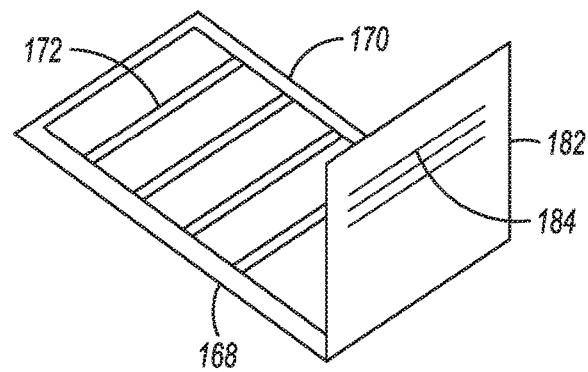
Figure 5F:
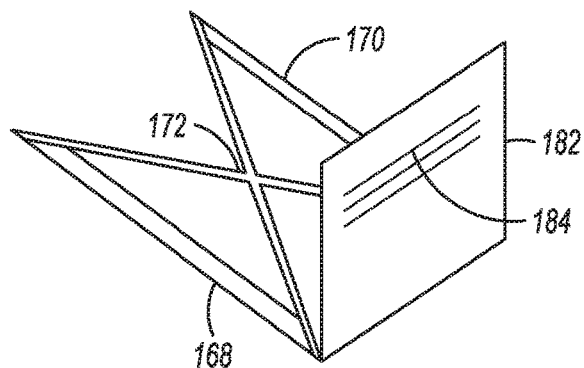

FIGS. 1-4 depict a directional control valve 100 including a guard 102, in accordance with embodiments of the present disclosure. More specifically, FIG. 1 is an isometric view of a directional control valve 100 including a guard 102; FIG. 2 is a top view of the directional control valve 100 including the guard 102; FIG. 3 is a cross-sectional view of the directional control valve 100 including the guard 102; and FIG. 4 is an exploded isometric view of an anterior portion of the directional control valve 100 and the guard 102. As described in more detail below, the guard 102 is configured to prevent the accidental manual activation of the directional control valve 100. The directional control valve 100 depicted in FIGS. 1-4 is only an example of one type of directional control valve for which the guard 102 can be used. However, the guard 102 may be used in other types of directional control valves having manual actuation buttons.

In embodiments, the body 104 of the directional control valve 100 includes two pilot valves 106, 108 (depicted in FIG. 3), which, upon actuation in response to one or more conditions being met, switch the directional control valve 100 between two states, which are explained below. More specifically, the pilot valves 106, 108 may include respective conductive coils 110, 112 that generate a magnetic force in response to a current passing through the conductive coils 110, 112. In embodiments, a controller can initiate a current through one of the magnetic coils 110, 112 in response to one or more conditions being met. The magnetic force generated by the conductive coil 110 is configured to displace a movable iron core 114, which in turn opens or closes a first valve member 116. In response to the first valve member 116 opening, air from an air supply hole 118 is provided to a first pressure chamber 120, which in turn drives a first piston 122. The drive from the first piston 122 moves an actuator 124 to a first position. When the actuator 124 is in the first position, a first air opening 126 is in communication with a first port 128 via internal conduits of the body 104. The first air opening 126 is configured to withdraw air from any conduit or port that the first air opening 126 is in communication with, which configures the first port 128 to be in a suction state. In addition, when the actuator 124 is in a first position, a second air opening 130 is in communication with a second port 132 via internal conduits of the body 104. The second air opening 130 is configured to expel air into any conduit or port that the second air opening 130 is communication with, which configures the second port 132 to be in a ventilating state. When the actuator 124 is in the first position, which configures the first port 128 to be in a suction state and the second port 132 to be in a ventilating state, the directional control valve 100 may be considered to be in a first state.

Conversely, the magnetic force generated by the conductive coil 112 is configured to displace a moveable iron core 134, which in turn opens or closes a second valve member 136. In response to the second valve member 136 opening, air from the air supply hole 118 is provided to a second pressure chamber 138, which in turn drives a second piston 140. The drive from the second piston 140 moves the actuator 124 to a second position which puts the first air opening 126 in communication with the second port 132 via internal conduits of the body 104. Because the first air opening 126 is configured to withdraw air from any conduit or port that the first air opening 126 is in communication with, the first air opening 126 configures the second port 132 to be in a suction state. In addition, when the actuator 124 is in the second position, the second air opening 130 is in communication with the first port 128 via internal conduits of the body 104. Because the second air opening 130 is configured to expel air into any conduit or port that the second air opening 130 is in communication with, the second air opening 130 configures the first port 128 to be in a ventilating state. When the actuator 124 is in the second position, which configures the first port 128 to be in a ventilating state and the second port 132 to be in a suction state, the directional control valve 100 may be considered to be in a second state.

Depending on which of the first and second states the directional control valve 100 is disposed in, a component of the system into which the directional control valve 100 is incorporated may actuate in different directions and/or move to different locations. For example, when the directional control valve 100 is incorporated into a servo-track writer, a component of a servo-track writer may move to different locations in order to clamp or unclamp a pack of disks from a spindle. While only two states are described herein, in embodiments, the directional control valve 100 may include more than two different states.

The directional control valve 100 may include one or more manual activation buttons 142 disposed on a top face 144 of the directional control valve 100. In embodiments, the manual activation buttons 142 may be biased towards the top face 144 of the directional control valve via a return spring 146. As such, an operator may compress the return spring 146 by pressing the manual activation button 142. And, upon an operator ceasing to depress the manual activation buttons 142, the manual activation button 142 returns to upward in response to the force of a return spring 146.

In embodiments, the manual activation button 142 may be manually actuated in order to switch the directional control valve 100 between the first state and the second state. For example, when the manual activation button 142 is biased upwards, towards the top face 144 of the directional control valve 100 via the return spring 146, the manual activation button 142 does not change the state of the directional control 100. However, when the manual activation button 142 is depressed, the manual activation button 142 may change the state of the directional control valve 100. For example, in response to the manual activation button 142 being pressed, the first manual activation button 142 may configure the air supply hole 118, via internal mechanisms of the housing 104, to be in communication with the first pressure chamber 120. As set forth above, when the air supply hole 118 is in communication with the first pressure chamber 120, the first port 128 is in a suction state and the second port 132 is in a ventilation state. In embodiments, the directional control valve 100 may include a second manual activation button (not shown), which configures the air supply hole 118 to be in communication with the second pressure chamber 138. As set forth above, when the air supply hole 118 is in communication with the second pressure chamber 138, the first port 128 is in a ventilation state and the second port 132 is in a suction state. While only one manual activation button 142 is depicted, the directional control valve 100 may include more or fewer manual activation buttons 142. The number of manual activation buttons 142 may depend on the number of states which the directional control valve 100 can be configured to be in. Additionally or alternatively, the manual activation button 142 may twisted in order to activate a manual activation button 142.

In embodiments, the directional control valve 100 may include a safety member 148 that is configured to lock the manual activation button 142 upwards, towards the top face 144 of the directional control valve 100 so that the state of the directional control valve 100 cannot be changed without moving the safety member 148. In embodiments, the safety member 148 can be moved between a first position that is towards manual activation button 142 and a second position that is away from manual activation button 142 relative to the first position. The safety member 148 may be secured to the directional control valve 100 by a locking protrusion 150 (depicted in FIG. 4) that is configured to overstride a guide 152 of the directional control valve 100. For example, the guide 152 may include grooves 154 on one or both side of the guide 152. And, the locking protrusion 150 may be inwardly formed in order to engage with a groove 154 of the guide 152. In embodiments, the safety member 148 may include grip protrusions 156 to reduce the likelihood of an operator's finger slipping when moving the safety member 148. Additionally or alternatively, the safety member may include an arrow 158 to indicate the direction of motion of the safety member 148.

To lock the manual activation button 142 upwards, towards the top face 144 of the directional control valve 100, the safety member 148 may include a locking extension 160 (depicted in FIG. 4) extending towards the manual activation button 142. The locking extension 160 may include crescent portion 162 that is configured to extend around a portion of the circumference of the manual activation button 142. Further, the manual activation button 142 may include a lip 164 (depicted in FIGS. 3 and 4) that overlaps and, potentially, contacts the crescent portion 162 when the safety member 148 is in the first position. Because the safety member 148 and, more particularly, the crescent portion 162 do not have a spring or other mechanism that allows movement of the safety member 148 downward, away from the top face 144 of the directional control valve 100, if an operator were try to press a manual activation button 142, the lip 164 of the manual activation button 142 would prevent the manual activation button 142 from being depressed due to its contact with the crescent portion 162. However, when the safety member 148 is moved to the second position, the crescent portion 162 no longer overlaps the lip 164 of the manual activation button 142. As such, when an operator tries to depress the manual activation button 142, the lip 164 no longer contacts the crescent portion 16 and the manual activation button 142 is able to be depressed.

In embodiments, the directional control valve 100 includes a coupling member 166. The coupling member 166 is configured to slide along the guide 152 of the directional control valve 100, between a first position and a second position, in order to couple the directional control valve 100 to other directional control valves. The coupling member 166 is described in more detail in U.S. Pat. No. 7,316,244, issued Jan. 8, 2008, and entitled "Solenoid Valve with Manual Buttons," the entirety of which is hereby incorporated herein by reference for all purposes.

Oftentimes, a directional control valve 100 described herein will be removed, replaced, tested and/or adjusted by an operator when a directional control valve is incorporated into a system. Due to an operator being in contact with a directional control valve 100, the opportunity for the safety member 148 to be accidentally repositioned from the first position to the second position may occur such that a manual activation button 142 can accidentally be depressed.

To reduce the likelihood of accidentally shifting the safety member 148 from the first position to the second position, the embodiments herein include a guard 102. The guard 102 is configured to prevent the accidental manual activation of the directional control valve 100. To do so, the guard 102 is configured to be disposed between the safety member 148 and the coupling member 166. While disposed between the safety member 148 and the coupling member 166, the guard 102 is configured to prevent the safety member 148 from being repositioned from the first position to the second position and/or to a position where a lip 164 of a manual activation button 142 no longer overlaps the crescent portion 162 of the safety member 148. Because the guard 102 is configured to prevent the safety member 148 from moving to a position where the lip 164 no longer overlaps the crescent portion 162, the manual activation button 142 is prevented, by the guard 102, from accidentally being pressed as described above.

Examples of the guard 102 are depicted in FIGS. 5A-5F, in accordance with embodiments of the present disclosure. The guard 102 includes a first end 168, a second end 170, and a middle portion 172 that extends between the first and second ends 168, 170. When the guard 102 is positioned between the safety member 148 and the coupling member 166 of the directional control valve 100, the first end 168 may be positioned near the safety member 148 and the second end 170 may be positioned near the coupling member 166 or vice-versa. In embodiments, the guard 102 contacts respective sides 174, 176 (depicted in FIG. 3) of the safety member 148 and the coupling member 166 when disposed between the safety member 148 and the coupling member 166. In alternative embodiments, the guard 102 allows slight movement of the safety member 148 but, as set forth above, restricts movement of the safety member 148 so that a lip 164 at least partially overlaps a respective crescent portion 162 of a manual activation button 142, thereby preventing actuation of a manual activation button 142.

In embodiments, one or both of the first and second ends 168, 170 may extend along the entire length of the respective sides 174, 176 of the members 148, 166. Alternatively, one or both of the first and second ends 168, 170 (depicted in FIG. 5C) may be shorter than the length of the respective sides 174, 176 and, therefore, only partially extend along the length of the respective sides 174, 176.

The middle portion 172 may be comprised of different shapes. For example, the middle portion 172 may have: a substantially planar sheet that extends between the first and second ends 168, 170 (depicted in FIGS. 5A-5D), columns (depicted in FIG. 5E), an x-shape extending between the first and second ends 168, 170 (depicted in FIG. 5F), and/or have any other type of shape or structure that includes one or more sections that extend between the first and second ends 168, 170 and is able to withstand a sliding force that a person is capable of exerting on the safety member 148. In embodiments, the middle portion 172 may be able to withstand forces of approximately 0.5 N, 1 N, 2 N, 5 N, 10 N, and/or the like.

In embodiments, the first end 168, the second end 170, and/or the middle portion 172 may be comprised of the same or similar material. Alternatively, the first end 168, the second end 170 and/or the middle portion 172 may be comprised of different materials. In embodiments, the guard 102 (including the first end 168, the second end 170 and/or the middle portion 172) may be comprised of materials including, but not limited to, different types of: plastics (e.g., nylons), ceramics, metals, and/or the like. Further, the guard 102 can be colored to help operators see that the guard 102 is installed.

In embodiments, the guard 102 may include one or more side extensions 178 extending perpendicular or substantially perpendicular to a planar surface connecting the first and second ends 168, 170. In embodiments, the side extensions 178 may reduce the likelihood the guard 102 is accidentally removed from the directional control valve 100 by extending along one or more sides of the guide 152, thereby reducing the side-to-side mobility of the guard 102. Additionally or alternatively, one or more of the side extensions 178 may contribute to preventing the safety member 148 from being repositioned from the first position to a position where a lip 164 of a manual activation button 142 no longer overlaps the crescent portion 162 of the safety member 148.

In embodiments, one or both of the side extensions 178 may include a groove protrusion 180 (depicted in FIG. 5A) that extends along the side extensions 178 and is configured to fit into one or more of the grooves 154 of the directional control valve 100. By extending into one or more of the grooves 154, the groove protrusion 180 reduces the likelihood that the guard 102 is accidentally dislodged from the directional control valve 100 by providing resistance to a force exerted on the guard 102 in a direction toward the top face 144 of the directional control valve 100.

Additionally or alternatively, the guard 102 may include a gripping extension 182 that extends perpendicular to a planar surface connecting the first and second ends 168, 170. In addition, the gripping extension 182 extends in an opposite direction to the side extensions 178. The gripping extension 182 facilitates an operator's intentional removal of the guard 102 from the directional control valve 100. In embodiments the gripping extension 182 may extend along the entire length of the middle portion 172 to the first and second ends 168, 170. Alternatively, the gripping extension 182 may only extend partially along the length of the middle portion 172. In embodiments, the gripping extension 182 may include one or more grip protrusions 184 to facilitate gripping of the gripping extension 182. While all of the guards 102 depicted in FIGS. 5A-5F include a gripping extension 182, in embodiments, the guard 102 may not include a gripping extension 182.

In embodiments, the guard 102 may be coupled to the body 104 of the directional control valve 100. For example, a side extension 178 may be secured to a side of the body 104 via one or more mechanisms including, but not limited to, a hinge 186 (depicted in FIG. 5B), a plug 188 (depicted in FIG. 4) that fits into a hole 190 (depicted in FIGS. 4 and 5C) in a side extension 178 and a hole 192 in the side of the body 104. In certain embodiments, the hole 190 can positioned within the middle portion 172. For example, the guard 102 may be retained onto the upper body of the valve by means of a 0-80 screw providing that the user is comfortable in drilling and tapping a hole in the upper body of the valve. In embodiments where a hinge 186 couples the guard 102 to the body 104, the safety member 148, or the coupling member 166, the hinge 186 may allow an operator to swing the guard 102 out from between the members 148, 166, so the safety member 148 can be slid away from the manual activation button 142, allowing a user to actuate a manual activation button 142. For example, the guard 102 may be formed as part of the body 104, the safety member 148, or the coupling member 166 of the directional control valve 100. In certain embodiments, the guard 102 is a component that is removably coupled to the directional control valve 100. In certain embodiments, the directional control valve 100 and the guard 102 could be sold as separate components in a kit, where the kit is sold with guard 102 being uncoupled to the directional control valve 100. As described above, when the kit components are assembled, the guard 102 can be coupled to the directional control valve 100 (and/or the body 104) to restrict movement of the safety member 148 to prevent actuation of the manual activation button 142. Various modifications and additions can be made to the exemplary embodiments discussed without departing from the scope of the present disclosure. For example, while the embodiments described above refer to particular features, the scope of this disclosure also includes embodiments having different combinations of features and embodiments that do not include all of the described features.

Accordingly, the scope of the present disclosure is intended to embrace all such alternatives, modifications, and variations as fall within the scope of the claims, together with all equivalents thereof.

What is claimed is:

1. A directional control valve comprising:
   a body;
   an actuator integrated into the body, the actuator configured to switch the directional control valve between two or more states;
   at least one manual activation button configured to initiate actuation of the actuator when pressed;
   a safety member configured to slide along a guide of the body between a first position and a second position, wherein when the safety member is in the first position the manual activation button is prevented from being actuated, and wherein when the safety member is in the second position the manual actuation button can be manually actuated;
   a coupling member configured to couple the directional control valve to other directional control valves; and
   a guard removably disposed between the safety member and the coupling member, the guard configured to prevent the safety member from sliding along the guide to the second position when the guard is disposed between the safety member and the coupling member.

2. The directional control valve of claim 1, wherein the guard is coupled to the body.

3. The directional control valve of claim 2, wherein the guard is coupled to the body via a hinge.

4. The directional control valve of claim 2, wherein the guard is coupled to the body via a plug fitting into a hole of the body and a hole of the guard.

5. The directional control valve of claim 1, wherein an end of the guard extends along an entire length of at least one of: the coupling member and the safety member.

6. The directional control valve of claim 1, wherein the guard includes a first end, a second end, and a middle portion extending between the first and second ends, wherein the middle portion comprises at least one of: a substantially planar sheet, an x-shape, and a plurality of columns.

7. The directional control valve of claim 1, wherein the guard includes a first end, a second end, a middle portion extending between the first and second ends, and a side extension extending perpendicular to a planar surface extending between the first and second ends.

8. The directional control valve of claim 7, wherein the side extension comprises a groove protrusion configured to fit into a groove of the guide.

9. The directional control valve of claim 1, wherein the guard includes a gripping extension.

10. The directional control valve of claim 1, wherein the gripping extension includes gripping protrusions.

11. A directional control valve comprising:
a body;
an actuator integrated into the body, the actuator configured to switch the directional control valve between two or more states;
a manual activation button configured to initiate actuation of the actuator when pressed;
a safety member configured to slide along a guide of the body between a first position and a second position, wherein when the safety member is in the first position the manual activation button is prevented from being actuated, and wherein when the safety member is in the second position the manual activation button can be manually actuated; and
means for maintaining the safety member in the first position.

12. The directional control valve of claim 11, further comprising a means for coupling the means for maintaining the safety member in the first position to the body.

13. The directional control valve of claim 12, wherein the means for maintaining the safety member in the first position is coupled to the body via a hinge.

14. The directional control valve of claim 12, wherein the means for maintaining the safety member in the first position is coupled to the body via a plug fitting into a hole of the body and a hole in the means for maintaining the safety member in the first position.

15. The directional control valve of claim 11, wherein the means for maintaining the safety member in the first position extends along an entire length of at least one of: the coupling member and the safety member.

16. The directional control valve of claim 11, wherein the means for maintaining the safety member in the first position includes a first end, a second end, and a middle portion extending between the first and second ends, wherein the middle portion comprises at least one of: a substantially planar sheet, an x-shape, and a plurality of columns.

17. The directional control valve of claim 11, wherein the means for maintaining the safety member in the first position includes a first end, a second end, a middle portion extending between the first and second ends, and a side extension extending perpendicular to a planar surface extending between the first and second ends.

18. The directional control valve of claim 17, wherein the side extension comprises a groove protrusion configured to fit into a groove of the guide.

19. The directional control valve of claim 11, wherein the means for maintaining the safety member in the first position includes a gripping extension.

20. A directional control valve kit having component parts being capable of being assembled, the directional control valve kit comprising:
a directional control valve including:
a body,
an actuator integrated into the body, the actuator configured to switch the directional control valve between two or more states,
at least one manual activation button configured to initiate actuation of the actuator when pressed,
a safety member configured to slide along a guide of the body between a first position and a second position, wherein when the safety member is in the first position the manual activation button is prevented from being actuated, and wherein when the safety member is in the second position the manual actuation button can be manually actuated, and
a coupling member configured to couple the directional control valve to other directional control valves; and
a guard configured to be removably disposed between the safety member and the coupling member to prevent the safety member from sliding along the guide to the second position.

* * * * *